United States Patent Office 3,544,487
Patented Dec. 1, 1970

3,544,487
CROSS-LINKED POLYTETRAHYDROFURAN POLYMERS
Andrew P. Dunlop, Riverside, Norman E. Rustad, Barrington, and Edward Sherman, Chicago, Ill., assignors to The Quaker Oats Company, Chicago, Ill., a corporation of New Jersey
No Drawing. Filed June 16, 1967, Ser. No. 646,460
Int. Cl. C08g 43/00
U.S. Cl. 260—2                                    5 Claims

ABSTRACT OF THE DISCLOSURE

This disclosure relates to cross-linked ploymers having the formula

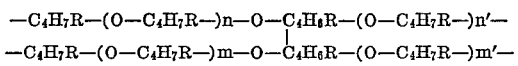

in which $n$, $n'$, $m$ and $m'$ represent integers which may be alike or different and which are such that the molecular weights of the backbone chains are 300–3000, and wherein R represents hydrogen or substituent polymeric residues resulting from the polymerization of compounds of formula

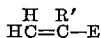

in which $R'$ is hydrogen or $CH_3$ ond E represents an electron sink. These cross-linked polymers are useful polymeric intermediates, e.g. in urethane applications.

BACKGROUND OF INVENTION

The well known linear polytetramethylene ether homopolymers are prepared by polymerization of tetrahydrofuran. Those linear polymers having molecular weights up to about 800 are liquid; polymers above about 800, especially 1000 and above, crystallize and solidify on standing at room temperature. These linear polymers are useful as polymeric intermediates, e.g. in urethane applications.

The direct cross-linked polytetramethylene ether polymers of this invention, either alone or in admixture with the non-cross-linked starting material, are likewise useful as polymeric intermediates. When in admixture with linear starting polymer the presence of the cross-linked polymers of this invention lead to the inhibition of the crystallization of the linear polymer, e.g. starting material. Moreover, the presence of cross-linked polymer of this invention in admixture with linear starting material leads to dramatic changes in the physical properties of higher molecular weight poylmers prepared therefrom, e.g. by extension with diisocyanates.

It is an object of this invention to provide new and useful polymers from tetrahydrofuran which are characterized by a direct carbon-to-carbon link between at least two linear polytetramethylene ether chains. It is a further object of this invention to provide cross-linked polymers of tetrahydrofuran which are also grafted, e.g. with polystyrene. It is also an object of this invention to provide cross-linked homopolymers and grafted cross-linked polymers of polytetramethylene ether which have more than two terminal functional groups which are useful as polymeric intermediates in the preparation of higher molecular weight cross-linked polymers, thereby eliminating the necessity of subjecting the high molecular weight polymers to cross-linking conditions.

SUMMARY OF THE INVENTION

The objects of this invention are achieved in a new composition of matter consisting of cross-linked polymers in which polytetramethylene ether chains are linked together by a direct carbon-to-carbon bond having Formula I, namely:

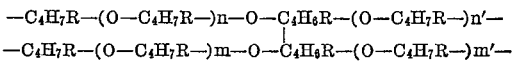

wherein $n$, $n'$, $m$ and $m'$ are integers which may be alike or different and have values such that the individual linear backbone chains have a molecular weight more than 300 and less than 3000, R represents hydrogen or substituent polymeric residues, free of ethylenic unsaturation, resulting from the polymerization of compounds having the Formula II

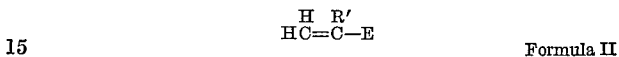

Formula II in which $R'$ is hydrogen or $CH_3$ and E represents an atom or group of atoms which constitute an electron sink. Examples of materials which can constitute an electron sink include chloride, phenyl, acetoxy, carboxy esters, and the like, such that the substituent represented by E provides a negative inductive effect or a dynamic negative electromeric effect. As indicated above, the polytetramethylene ether backbones of the cross-linked chains have molecular weights of more than 300 and less than 3000.

A preferred embodiment of this invention is the new composition of matter which is a cross-linked homopolymer of tetrahydrofuran in which polytetramethylene ether homopolymer chains are linked together by a direct carbon-to-carbon bond as shown in Formula III

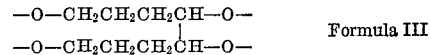

Formula III said homopolymer chains having a molecular weight of more than 300 and less than 3000.

We have been unable to prepare compositions of this invention from linear polytetramethylene ether polymers using chemical free radical generators other than compounds of the formula POOP', where P and P' may be alike or different and wherein P and P' are substituents in which the structure adjacent to the peroxy group is a member selected from the group aroyl and a tertiary carbon to which is attached at least two methyl groups. We have discovered that upon contacting linear polytetramethylene polymers having a molecular weight from 300 to 3000, with the free radical generator having the formula POOP', defined above at a temperature of from 80° to 230° C., the compositions of this invention are produced.

If, in addition to the polytetramethylene ether polymers and free radical generators having the formula POOP', there is also present compounds of Formula II, grafted compounds of this invention are produced. These compounds are characterized by the direct cross-link between the backbone chains, and also by the presence of polymeric grafts pendantly attached to the linear polyether backbone (see Formula I). Examples of compounds of Formula II, which are satisfactory for use in accordance with this invention, include styrene, vinyl chloride, acrylonitrile, vinyl acetate, butyl acrylate and butyl methacrylate.

Many of the compositions of this invention, particularly the hydroxy-terminated embodiments, are useful as prepolymers for incorporation in polyurethanes by reaction with or by extension with polyisocyanates. Any of the compounds of this invention can be incorporated into polystyrene-type resins, e.g. using with styrene and a hydroperoxide. Furthermore, all of these compounds are useful as polymeric intermediates in reaction sequences to produce other valuable polymeric intermediates, e.g. by conversion of chloro-to-amine-substituted polymers which are useful as polymeric epoxy hardeners.

As used herein, the term tetrahydrofuran homopolymer means compounds having molecular weights from 300 to 3000 and composed entirely of the structure —CH$_2$CH$_2$CH$_2$CH$_2$(OCH$_2$CH$_2$CH$_2$CH$_2$)$_n$— with substituent groups such as X, OA and OR″ wherein X is a halogen, A is acyl or aroyl and R″ is hydrogen and saturated or unsaturated hydrocarbon having 1 to 10 carbons, satisfying the terminal valences of the chains. Suitable OA groups include, e.g., CH$_3$COO—, C$_6$H$_5$COO— as well as ester acids derived from dibasic acids or anhydrides having less than 11 carbon atoms, such as

—OOCC$_2$H$_4$COOH, —OOC—C$_6$H$_4$COOH, —OOCH=CHCOOH etc. Methods for preparing terminally unsaturated embodiments are discussed herein after numbered Example 8. As used herein, the term "linear polytetramethylene ether polymers' includes compounds containing a linear polytetramethylene ether backbone of 300 to 3000 molecular weight units provided entirely by the recurring unit —(OC$_4$H$_7$R)— in which R is hydrogen and polymeric residues free of ethylenic unsaturation obtained from the monomers defined above in Formula II. As used herein, the term "contact" includes liquid phase admixing or dissolving and any other contacting in which the reaction system is in a liquid phase at the reaction temperature.

As used herein, the term backbone includes the carbon, hydrogen and oxygen making up the linear chain, but does not include polymeric grafts appended thereto or groups satisfying terminal valences. Hence, those portions of the polymer molecular weight which are contributed by or due to the molecular weignt of the graft or due to molecular weight of end-group substituents are not included in the molecular weight of the backbone, as used herein.

The free radical generators defined above which are useful in the preparation of the composition of this invention, are those peroxides the decomposition of which results in two radicals capable of hydrogen abstraction. To be most effective, the two radicals are preferably of like reactivities. Furthermore, the catalyst should be one which does not decompose too quickly at reaction temperatures. Generally speaking, compounds of formula POOP′ which have a half-life between 0.1 minute and 50 hours at the reaction temperature are satisfactory to produce the compositions of this invention. Typical of the peroxy compounds which have been found useful in this invention are dicumyl peroxide, di-t-butyl peroxide, t-butyl perbenzoate, t-butyl-1,1,3,3-tetramethylbutyl peroxide and 2,5-dimethyl-2,5-di-(t-butyl peroxy)hexane.

It is desirable to know the relationship between the amount of cross-linking and the time required to achieve it. At a given temperature this relationship may be approximated by the following mathematical formula:

$$\text{Percent XL} = \frac{2nM\left[1-\left(\frac{1}{2}\right)^{t/t_{1/2}}\right] \cdot 100}{\text{moles polyether polymer}}$$

where

Percent XL=theoretical maximum percent cross-linking; i.e. that percent of the *starting* molecules which are bound by one cross-link.
$n$=number of —OO— linkages per mole peroxy compound.
$M$=number of moles of peroxy compound.
$t$=time of reaction.
$t_{1/2}$= half-life of the peroxy compound at the given temperature.

The above mathematical formula can be used, for example, to readily approximate the amount of time required to achieve a desired theoretical amount of cross-linking, given a particular amount of catalyst and reaction temperature. Naturally, use of the formula will not be meaningful if other peroxide-consuming reactants are present in the system.

The peroxy compounds of formula POOP′ will yield decomposition products that contain volatile and/or non-volatile constituents depending on the chemical structure of the particular peroxy compound employed. These decomposition substances may be left in the product or, if so desired, may be removed by chemical or physical means such as by distillation, sublimation, filtration or extraction, for example. When the peroxy compound used yields volatile decomposition products it may be desirable to operate the process under reduced pressure to remove these decomposition products as they are formed or, alternatively, the contacting may be accomplished under pressure and the volatile decomposition products later removed by application of vacuum. Whether or not the decomposition by-products are removed, other variables being constant, the amount of polytetramethylene oxide containing polymer which is cross-linked is unaffected.

Unconsumed peroxy compound that is not volatile under the reaction conditions employed will remain in the cross-linked polymer product. This residual peroxy compound may be used as a latent catalyst for additional cross-linking at some subsequent time by subjecting the peroxy compound to an environment that will activate the catalyst, e.g., by heating it at from 80° C. to 230° C. If no latent catalytic activity is desired, it may be necessary to reduce the level of unconsumed peroxy catalyst to inconsequential levels if subsequent treatment is to be effected above 80° C. This may be accomplished by any of the methods known to those skilled in the use of peroxide or, in a further preferred embodiment of this invention, by operating the cross-linking process at a temperature of from 110° C. to 190° C. for a period of time representing at least five half-lives of the peroxy compound at the specific temperature used.

The cross-linked polymer obtained by the process of this invention may be adapted to many of the standard uses known to one skilled in the polymeric art, e.g., hydroxyl terminated cross-linked polymers of this type may be reacted with diisocyanates to form novel polyurethane products. Thus, a polytetramethylene ether glycol with a 30% graft of polystyrene which was cross-linked in accordance with this invention was reacted with diphenylmethane diisocyanate in toluene solution. The resulting solution was cast onto glass plates and cured at 60° C. This resulted in a clear, colorless, highly elastic film. The same process performed on a cross-linked polytetramethylene ether glycol with a 70% graft of polystyrene gave, after curing in like manner, a clear, colorless, tough, flexible, plastic film. As used herein, the term "percent graft" means the amount in parts by weight of polystyrene pendant group (or other pendant grafts as defined earlier) per 100 parts by weight of the grafted polytetramethylene ether polymer. Hence in this example, a 70% graft means that in 100 parts by weight of grafted polytetramethylene ether polymer, 70 parts by weight is grafted polystyrene.

Several properties are usually considered when discussing polymers. These properties include solubility, color, acid number, hydroxyl number and molecular weight. All of the cross-linked polymers obtained by the process of this invention may be dissolved in polytetramethylene oxide containing polymers, and most of them may be dissolved in aromatic or chlorinated solvents, to further increase their applicability to known standard uses.

Color is a very important property of polymers, the lesser the color, the greater the applicability of any given polymer. Cross-linked polymers prepared in accordance with this invention are relatively low in color depending on the initial color of the polytetramethylene ether containing polymer and the purity of the peroxy compound used. Colors as low as 30–50 on the APHA scale have been obtained.

The APHA standard color test was used to provide the data herein to indicate the quantity of intensity of color of the products. This test is one developed by the American Public Health Association which uses the Hagen Platinum Cobalt Scale, a description of which is found on page 2048 of the 5th edition of Standard Method of Chemical Analysis by Wilford W. Scott.

The term "acid number" represents the number of milligrams of potassium hydroxide equivalent to the titratable acidity in one gram of sample.

Hydroxyl number is the number of milligrams of potassium hydroxide equivalent to the acetic acid consumed in esterifying the hydroxyl groups in one gram of polymer sample. The hydroxyl number data reported herein are determined by acetylation using acetic anhydride in pyridine.

As used herein, the molecular weights of the polymers are expressed as number average molecular weights. Unless otherwise indicated, the "hydroxyl molecular weight" represents a molecular weight calculated on the basis of the assumption that there are exactly two hydroxy groups per molecule. (The hydroxyl molecular weight is determined by dividing 112,200 by the hydroxyl number. Since by our data the hydroxyl number is reproducible to ±1 hydroxyl number, the hydroxyl molecular weight values reported herein are reproducible to within about ±10 units at 1000 and about ±35 units at 2000.) The hydroxyl molecular weight value is also reported for cross-linked polyglycols which obviously have more than two hydroxy groups per cross-linked molecule. In this case, the hydroxyl molecular weight, as defined, merely indicates what the number average molecular weight would be assuming only two hydroxyl groups per molecule.

The "osmometer molecular weight" represents the number average molecular weight of all the components of the sample within experimental error. Osmometer molecular weight data reported herein is determined by means of a Mechrolab, Inc. Vapor Pressure Osmometer Model 302, using methyl ethyl ketone as solvent.

DESCRIPTION OF PREFERRED EMBODIMENTS

While this invention is not limited to these embodiments, it is further explained by the following examples in which "parts" means parts by weight. All temperatures are in degrees centigrade.

Example 1

In this example, a polytetramethylene ether glycol having a molecular weight of 1000 was cross-linked in three illustrative runs. For the purpose of comparison, a portion of the starting material was subjected to operating conditions identical to those encountered in the runs in which the polymer glycol was cross-linked except that no free radical initiator was present in this control. The product of this control run is labeled Control A. In each of the runs, the starting mixture was heated at 150° C. for one hour while the system was maintained at 10 mm. Hg pressure. After one hour at these conditions the pressure was lowered to 1 mm. Hg and after one hour at the lower pressure the resulting product was bottled and appropriately labeled. The data is summarized in Table I. The number in the first column under "Weight 1000 Linear" indicates the number of parts by weight of linear polytetramethylene ether glycol starting material initially present in the reaction mixture. The terms under the heading "Catalyst" identify the catalyst used in each run. "Di-Cup" represents dicumyl peroxide. In runs 1, 2 and 3, one part by weight of catalyst was used. MW (OH) represents molecular weight as determined from the hydroxyl number, as discussed above. MW (OSMO) represents the molecular weight as determined by osmometer. "Hydroxyl Number," "Acid Number" and "APHA Color" have also been defined above.

TABLE I

|  | Weight 1,000 Linear | Catalyst | MW (OH) | MW (OSMO) | Hydroxyl Number | Acid Number | APHA Color |
|---|---|---|---|---|---|---|---|
| Control A | 10 |  | 1,000 | 984 | 112.1 | .013 | 20-30 |
| Run 1 | 10 | (1) Di-Cup | 1,245 | 1,664 | 90.2 | .037 | 130 |
| Run 2 | 10 | (1) Di-Cup | 1,260 | 1,702 | 89.2 | .043 | 150 |
| Run 3 | 19 | (1) Di-Cup | 1,169 | 1,291 | 96.02 | .000 | 100 |

The molecular weight values reported for the product of Control A in Table I were within experimental error of values obtained on the control starting material prior to treatment.

It is apparent from Table I that both the hydroxyl molecular weight and the osmometer molecular weight increased as a result of the contacting with dicumyl peroxide. It is also apparent, however, that the molecular weight as measured by the osmometer increased to a much greater degree than the molecular weight as determined by the hydroxyl number.

Insofar as the molecular weight calculated from the hydroxyl number is based on the assumption that each molecule contains two hydroxy groups, it is apparent that if there is no change in the number of hydroxyl groups the molecular weight value based on the hydroxyl number should remain unchanged even though cross-linking between the backbone chains has occurred. However, any diminishment in the number of hydroxyl groups, i.e. any lowering of the hydroxyl number, will result in a corresponding increase in the hydroxyl MW calculated therefrom. Hence, if etherification between hydroxyl groups occurs or if hydroxyl groups are oxidized to carboxyl and the carboxyl couples with hydroxyl groups on other chains, the increase in calculated hydroxyl molecular weight will correspond to a real increase in molecular weight in the sample. On the other hand, if hydroxyl groups are merely lost by dehydration or oxidized to carboxyl and *no* coupling occurs, a decrease in hydroxyl number will also be observed, but there will be an increase in the calculated hydroxyl molecular weight even though there is no substantial real increase in molecular weight. Such increase in corresponding calculated hydroxyl molecular weight is manifestly anomalous. Hence, in most instances in the following examples hydroxyl molecular weight data is omitted. However, hydroxyl numbers continue to be significant because this number governs the amount of diisocyanate to be added to polymeric intermediatees in urethane applications, for example.

As indicated above the increase in osmometer molecular weights substantially exceeds the increase in the calculated hydroxyl molecular weights reported in Table I. Since the calculated hydroxyl number may be anomalous in view of the possible side reactions described in the preceding paragraph, only comparisons made between osmometer molecular weights are reliably significant.

In runs 1 and 2 the osmometer molecular weight increased from 984 to 1664 and 1702, respectively. In run 3, which utilized about half the level of peroxide that was employed in run 1, the increase in molecular weight values is considerably less than that achieved in run 1. This was expected in view of the smaller amount of cross-linking agent used in run 3. While the color of the cross-linked product is higher than that of the control, the product is still of sufficiently high quality that the product polymer mixture may be used in many urethane applications. The products of runs 1, 2 and 3 are in accordance with this invention.

Example 2

In this example, the procedures of Example 1 were repeated exactly in a control run (Control B), and a cross-linking run (run 4) except that the linear polytetramethylene ether glycol starting material had a molecular weight of 2000. In run 4, one part by weight of dicumyl peroxide was employed. The data of this example is summarized in Table II, in which the headings are as defined in Example 1.

TABLE II

|           | Weight 2,000 Linear | Catalyst | MW (OH) | MW (OSMO) | Hydroxyl Number | Acid Number | APHA Color |
|-----------|---------------------|----------|---------|-----------|-----------------|-------------|------------|
| Control B |                     |          | 1,920   | 1,869     | 58.46           | .018        | 100        |
| Run 4     | 9                   | 1        | 2,205   | 2,626     | 50.99           | .026        |            |

The product of run 4 is in accordance with this invention.

Example 3

This example illustrates the production of a composition of this invention which contains a polystyrene graft. In the control run of this example, which is reported herein as Control C, linear polytetramethylene ether glycol (MW 1000) is contacted with dicumyl peroxide, but not with styrene. The starting mixture of Control C, and runs 5 and 6, is subjected to conditions identical to those employed in Example 1. In runs 5 and 6, however, dicumyl peroxide was employed and also present in the reaction mixture at the start of the procedure was 100 parts by weight of styrene. The data of this example is summarized in Table III, in which the headings are as defined in Example 1.

TABLE III

|           | Weight Linear | Di-Cup | Styrene | OH Number | Acid Number | MW (OSMO) |
|-----------|---------------|--------|---------|-----------|-------------|-----------|
| Control C | 230           | 5      |         | 105.3     | .030        | 1,106     |
| Run 5     | 230           | 5      | 100     | 81.56     | .020        | 3,387     |
| Run 6     | 230           | 10     | 100     | 78.80     | .061        | 1,512     |

Example 4

In this example, linear polytetramethylene ether glycol homopolymer (MW 1000) is first grafted with styrene in the presence of t-butyl hydroperoxide (TBH) to produce a polymer having a linear polytetramethylene ether glycol backbone with pendant polystyrene grafts. It has been found that the use of tertiary butyl hydroperoxide causes some ester formation, but no detectable amount of cross-linking. The data of the procedure of this grafting step is summarized in Table IV in run 7. The product of run 7 is not in accordance with this invention but is merely a grafted polymer with a linear polytetramethylene ether backbone. The product of run 7 was then contacted with dicumyl peroxide and cross-linked by the procedure described in Example 1. The data of this procedure is summarized under run 8 in Table IV.

TABLE IV

|        | Weight Linear | Di-Cup | TBH | Styrene | OH Number | Acid Number | MW (OH) | MW (OSMO) |
|--------|---------------|--------|-----|---------|-----------|-------------|---------|-----------|
| Run 7  | 230           |        | 5   | 100     | 79.40     | .050        | 1,423   | 1,388     |
| Run 8  | 330           | 5      |     |         | 76.16     | .058        | 1,471   | 1,501     |

It is noted that within experimental error, the increase in hydroxyl molecular weight and osmometer molecular weight resulting from the grafting step (i.e. run 7) is substantially identical. This evidence tends to support the statement above that no significant cross-linking occurs during the grafting step (run 7) if a hydroperoxide catalyst is used. In run 8, contacting the grafted polymer (produced in run 7) with dicumyl peroxide resulted in a slight decrease in hydroxyl number and a substantial increase in the molecular weight as determined by osmometer indicating a substantial amount of cross-linking has occurred.

As indicated above, the compositions of this invention are useful as polymeric intermediates in the preparation of higher molecular weight polymers, e.g. urethane polymers.

Runs identical to 7 and 8 were repeated to provide additional quantities of products identical to the products of run 7 and run 8 for the purpose of extension with diisocyanate. When cast into polyurethane films the extended products demonstrate vividly the wide difference in properties of the film prepared from cross-linked grafted polytetramethylene ether polymers as compared to the extended polymers prepared from the non-cross-linked grafted polyether starting material. Urethane film was prepared as follows:

(1) Styreneated polytetramethylene ether glycol produced in run 7 was reacted with a molar equivalent of MDI (i.e. p,p'-diphenylmethane diisocyanate) in toluene at 100° C. for 2 hours, under a nitrogen atmosphere, to give a "dope" containing about 33% non-volatiles.

(2) The "dope" was then diluted further with toluene to ca. 15–20% non-volatiles, filtered through a bed of filter-aid (Celite) to achieve complete clarity and then poured onto glass plates that were very lightly coated with a silicone releasing agent.

(3) After 30 minutes at room temperature the plates were set in a 60° C. oven to cure. The cured film was stripped from the plate. In a second test this entire procedure was repeated except that the cross-linked product of run 8 was used in step 1, above.

Both films were elastic, but film from product of run 7 was more tacky and was weaker in terms of tensile strength and force required to extend its length. The film prepared from the extension of the product of run 8 required more force to achieve the same elongation as film produced from extension of run 7 and exhibited higher tensile strength. In addition, the run 8 film exhibited instantaneous recovery to the unelongated state when the elongating force was released.

Both "dopes" and films were free of "fish-eyes," indicating the absence of gel particles. The filtration step is included in the above procedure to remove a slight haziness believed to be due to impurities present in the diisocyanate. A trace of haze would be observed in films produced without the filtration step though these films also would be free of "fish-eyes."

Separate experiments identical to the runs of Example 4 described above were performed using, however, varying amounts of styrene and varying amounts of peroxide but keeping the styrene-peroxide weight ratio constant.

As the amount of polystyrene grafts on cross-linked vs. non-cross-linked polyether backbones increases, all properties of the urethane films prepared therefrom retain the same relative differences as described above but with the marked exception that the films revert from an elastic type at the 30% graft level to a plastic and essentially non-elastic type at the 70% graft level.

Example 5

This example illustrates the varying degree of cross-link achieved by using various contacting temperatures and various polytetramethylene ether glycol to catalyst ratios. Eight runs numbered 9 through 16 were made, using dicumyl peroxide (Di-Cup) or benzoyl peroxide (benzoyl) as indicated in Table V. The linear polytetramethylene ether glycol starting polymer had a molecular weight of 1000. The procedures and product data are summarized in Table V. "Half-life" refers to the literature-reported half-life of the catalyst at the temperature of the reaction. The ratios of reactants are listed under "Parts Linear Parts Catalyst" and the time at reaction time is listed under "RX Time." The osmometer molecular weight is defined above. In runs 9 through 12 in which dicumyl peroxide was employed, the reaction was carried out at a pressure of 10 mm. Hg, after which the reactants were discussed for one hour at below 1 mm. Hg. In runs 10 through 12, the times were governed by the onset of gelation. In run 10, the product became highly viscous, approaching gelation, whereas in runs 11, 12 and 13 definite gelation occurred. In runs 10 through 13, the starting reactants constituted a liquid mass in which the stirrer moved. Shortly before the time indicated for these runs in Table V, however, a rather abrupt increase in viscosity was observed and the mass soon became a large ball on the stirrer. Gas bubbles generated within the mass converted it into a mass of foam. At this point these runs, i.e., 10–13, were terminated and sujected to the reduced pressure degassing. Of the runs of this example using dicumyl peroxides, only the reactants of run 9 remained flowable throughout the entire processing period. In each of the runs in which gelation occurred, the gel was heated to above 200° to completely melt the product in order to remove the product from the reaction vessel.

Due to the insolubility of the products of runs 10 through 13 in toluene and methyl ethyl ketone, osmometer molecular weight determinations were not made. It was found that at room temperature the products of runs 10 through 13 were insoluble in toluene, acetone and tetrahydrofuran, whereas the products of runs 9 and 14 through 16 were soluble in each of these solvents. The cross-linked gels of this invention were found to be soluble in polytetramethylene ether glycol.

In runs 13 through 16, using benzoyl peroxide, the reaction mixture was subjected to less than 1 mm. Hg pressure throughout the entire reaction period. In runs 14 through 16, the reactants remained liquid. After the time indicated in Table V, the product in each instance was heated to a temperature of 150° for a two-hour period at 1.0 mm. Hg to sublime the benzoic acid which results from the decomposition from the benzoyl peroxide catalyst.

Gelled and liquid cross-linked tetrahydrofuran homopolymers and grafted polytetramethylene ether polymers and grafted polytetramethylene ether polymers dissolved in polytetramethylene ether glycols have been extended with diisocyanates. The latter two diisocyanate-extended polymers have been cast into films.

Mixtures of cross-linked graft polytetramethylene ether glycol polymers dissolved in non-cross-linked grafted polytetramethylene ether glycol have also been extended with diisocyanate and cast into films.

Example 6

This example illustrates the liquifying effect which the product of this invention has on linear starting polymer, e.g., polytetramethylene ether glycol (PTMEG). In each of the four tests described in this example the sample was heated to 60° C. and subsequently permitted to stand at room temperature. The samples were observed from time to time for presence of solids and the time required for the sample to solidify is reported in Table VI.

TABLE VI

| Test No. | Sample | Time to solidify |
| --- | --- | --- |
| 17a | PTMEG-MW 2,000 | 1 week. |
| 17b | PTMEG-Crosslinked 5% Di-Cup. | 6 months. |
| 18a | PTMEG-MW 1,000 | 1 month. |
| 18b | PTMEG-Crosslinked 10% Di-Cup. | Hasn't crystallized after 1 year. |

Tests 17a and 18a may be regarded as controls. In these tests, linear polytetramethylene ether glycol (PTMEG) having molecular weights of 2000 and 1000, respectively, was employed. The material used in tests 17b and 18b is the product of the procedure of Example 1, using the 17a and 18a polyether glycol, respectively, as starting material and cross-linking this with 5% and 10% dicumyl peroxide, respectively. These cross-linking procedures gave an initially liquid mixture of linear and cross-linked polytetramethylene ether glycol. The liquifying effect is manifest from Table VI.

In a separate test, a sample of 2000 molecular weight linear polytetramethylene ether glycol starting material was admixed with a partially cross-linked (i.e. 45% cross-linked) material produced therefrom in such proportions as to give a mixture in which about 10% of the molecules in the mixture were the cross-linked compounds of this invention. Whereas the starting material solidified in 1 week, the mixture is not completely solidified even after 8 months. By "percent cross-link" is meant the mole percent of the linear starting molecules which are bound by at least one cross-link of the type defined above.

The amount of cross-link needed to substantially inhibit the solidification of the starting material depends on the molecular weight of the starting material. Generally,

TABLE V

| | Temp. | Catalyst | Half-life | Parts Linear Parts | Parts Linear Catalyst | RX, Time | MW (OSMO) |
| --- | --- | --- | --- | --- | --- | --- | --- |
| Run 9 | 150 | Di-Cup | 6 minutes | 100 | 10 | 2 hrs | 1,619 |
| Run 10 | 140 | Di-Cup | 30 minutes | 100 | 10 | 3 hrs | |
| Run 11 | 130 | Di-Cup | 2 hours | 50 | 30 | 1 hr | |
| Run 12 | 120 | Di-Cup | 7 hours | 10 | 20 | ¾ hr | (¹) |
| Run 13 | 110 | Benzoyl | 6 minutes | 100 | 20 | 1 hr | |
| Run 14 | 100 | do | 18 minutes | 100 | 15 | 3 hrs | 1,429 |
| Run 15 | 90 | do | 1 hour | 100 | 15 | 7 hrs | 1,627 |
| Run 16 | 80 | do | 4 hours | 100 | 10 | 40 hrs | 1,075 |

¹ Gelation.

We have found that the onset of gelation is governed by several variables, including initial molecular weights and the amount of cross-linking which has been achieved. For example, when the starting material has an average molecular weight of about 1000, gelation begins at approximately 60% cross-linking. Although the gels simply swell in toluene, they are readily soluble in linear polytetramethylene ether glycol. Generally, the gels remain insoluble in toluene even at the atmospheric pressure reflux temperature.

about 5% cross-link substantially inhibits solidification of 1000 MW starting material and about 10% cross-link substantially inhibits solidification of 2000 MW starting material.

This was completely unexpected. Though the higher molecular weight starting linear polymer generally solidified faster, the presence of these higher molecular weight cross-linked polymers resulted in slower solidification, if not complete inhibition of solidification.

Example 7

This example illustrates the preparation of another embodiment of the compound of this invention. Tetrahydrofuran was polymerized with fluosulfonic acid and the catalytic activity of the resulting mixture was terminated by the addition of substantially anhydrous methanol to the mixture. The resulting linear polymer was isolated by conventional means. It was found to have an hydroxyl number of 116, an acid number of 0.013, an hydroxy molecular weight (calculated on the basic that each molecule has one hydroxy group) of 484, and an osmometer molecular weight of 479. Essentially this linear polytetramethylene ether polymer had an hydroxy substituent at one end, and methoxy at the other end. One hundred parts of this linear mono-methoxy mono-hydroxy polytetramethylene ether was admixed with 15 parts of dicumyl peroxide and the mixture heated to 150° C. at 10 mm. Hg pressure for one hour and then for an additional hour at 150–170° C. at 2 mm. Hg pressure. The product was found to have an hydroxyl number of 100.5, an acid number of 0.065, and an osmometer molecular weight of 616. This product was a slightly yellow, viscous liquid. Our calculations based on the increase in molecular weight indicates that approximately 35% of the starting linear molecules were cross-linked to produce the composition defined in Formula I above. These cross-linked compounds now contain at least two hydroxy groups and are readily extended with diisocyanate.

Example 8

This example illustrates the preparation of an embodiment of this invention having Formula I in which the terminal substitutions are provided by ester-acids derived from dibasic acid anhydride. Linear polytetramethylene ether glycol was permitted to react with a stoichiometric amount of succinic anhydride thereby producing an ester-acid substituent at each end of the linear polymer. The resulting compound was found to have an osmometer molecular weight of 2183. The acid equivalent of 0.913 milli-equivalent per gram and saponification equivalent of .900 milli-equivalent per gram led to calculated molecular weights of 2190 and 2225, respectively. One hundred parts of the product of the above esterification step was admixed with 10 parts of dicumyl peroxide and the mixture was heated for 1 hour at 150° C. at 10 mm. Hg pressure and then 1 hour at 150–170° C. at 2 mm. Hg pressure. The resulting mixture exhibited a substantial increase in viscosity as compared to the initial reactants. An additional increment of 10 parts of dicumyl peroxide was subsequently admixed with the product mixture and immediately upon heating the resulting mixture to 150° C. at 10 mm. Hg a gel formed. This gel, i.e. the gel resulting from cross-linking with the second increment of dicumyl peroxide, was found to become fluid at about 200° C. Molecular weight was not determined because of insolubility of the gel. It is noted that an analysis of the product resulting from the first incremental addition of dicumyl peroxide indicated that some degradation of the half ester may have taken place, possibly due to trans-esterification with the hydroxy products of the decomposition of peroxide. Consequently, the preferred method for producing compounds of Formula I which contain ester-acid terminal substituents, particularly those containing ethylenic unsaturation such as maleate, is the method in which linear polytetramethylene ether glycol is initially cross-linked, for example as in the preceding Example 5, and thereafter (after removal of peroxide-derived low molecular weight hydroxy materials) the cross-linked hydroxy terminated polymer is esterified by addition of dibasic acid anhydride in an amount sufficient to provide one mole of anhydride per hydroxy substituent (in the molecule) to be esterified. These compounds of this invention with ester-acid terminal substituents are useful as polymeric intermediates for reaction with diisocyanate, for formation of polyester polymers, for preparation of the salt-type polymers by reaction with polyvalent cations, etc.

By the same token all embodiments of this invention which contain ethylenically unsaturated terminal substituents are preferably made by first preparing an entirely ethylenically saturated cross-linked embodiment, and subsequently incorporating the unsaturated terminal group. For example, one can allow hydroxy-terminated embodiment to react with a stoichiometric quantity of allyl glycidyl ether or butadiene monoxide, to provide

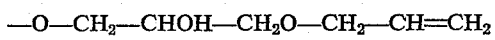

and —O—CH$_2$—CHOH—CH=CH$_2$ as terminal substituents, respectively. Also, hydroxy-terminated cross-linked embodiment of this invention can be allowed to react with ClCH$_2$—CH=CH$_2$ in the presence of NaOCH$_3$ to provide —O—CH$_2$—CH=CH$_2$ as a terminal substituent. The preceding three illustrations of unsaturated terminal substituents further illustrate embodiments discussed above, in which OR″ is the terminal substituent and R″ is unsaturated.

The terminally unsaturated embodiments of this invention are useful as polymeric intermediates. The terminally unsaturated substituent can be advantageously used by methods well known in the art, for example, by peroxide catalyzed polymerizations and by sulfur curing.

Example 9

Tetrahydrofuran was polymerized with chlorosulfonic acid and the catalytic activity of the resulting mixture was terminated with water. The resulting linear polytetramethylene ether polymer molecules contained essentially a chloro substituent at one end of the molecule and a hydroxyl substituent at the other end of the molecule. The hydroxyl molecular weight (based on the assumption that each molecule contained one hydroxyl substituent) was calculated to be 528. The osmometer molecular weight was also 528. Seventy parts of this polytetramethylene ether chlorohydrin were admixed with 15 parts of dicumyl peroxide and heated for 1 hour at 150° C. at 10 mm. Hg pressure and thereafter for 1 hour at 150–170° C. at mm. Hg pressure. The resulting product had an hydroxyl number of 94.16, an acid number of 0.090, and an osmometer molecular weight of 821. This cross-linked composition of this invention is useful as a pre-polymer for reaction with diisocyanate.

Therefore, we claim:

1. As a new composition of matter a homopolymer of tetrahydrofuran in which polytetramethylene ether chains are linked together by at least one direct carbon-to-carbon bond as shown in the formula

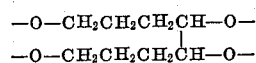

said ether chains having a molecular weight of more than 300 and less than 3000, the terminal valences affixed to the final carbon atom of the said chains being satisfied by substituents selected from the group X, OA and OR″, wherein X is halogen, A is acyl or aroyl, including ester-acids derived from dibasic acids and anhydrides having less than 11 carbon atoms, and wherein R″ is hydrogen or saturated or unsaturated hydrocarbon having 1 to 10 carbons.

2. A polymeric intermediate comprising a mixture of linear polytetramethylene ether homopolymer and polytetramethylene ether cross-linked homopolymer in which the linear polytetramethylene ether chains are linked together by at least one direct carbon-to-carbon bond as shown in the formula

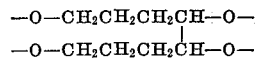

said ether chains having a molecular weight of more than 300 and less than 3000, the terminal valences affixed to the final carbon atoms of said homopolymer and said cross-linked homopolymer chains being satisfied by substituents selected from the group X, OA and OR", wherein X is halogen, A is acyl or aroyl, including ester-acids derived from dibasic acids and anhydrides having less than 11 carbon atoms, and wherein R" is hydrogen and saturated or unsaturated hydrocarbon having 1 to 10 carbons.

3. As a new composition of matter, a cross-linked polymer in which linear backbones of polytetramethylene ether chains are linked together by at least one direct carbon-to-carbon bond having the formula $$-C_4H_7R-(O-C_4H_7R)_n-O-\underset{|}{C_4H_6R}-(O-C_4H_7R)_{n'}-$$
$$-C_4H_7R-(O-C_4H_7R)_m-O-\underset{|}{C_4H_6R}-(O-C_4H_7R)_{m'}-$$

in which $n$, $n'$, $m$ and $m'$ represent integers such that the molecular weight of the individual backbone chains is more than 300 and less than 3000, and in which R represents hydrogen, or substituent polymeric grafts free of aliphatic unsaturation resulting from the polymerization of compounds having the formula $$\underset{HC=C-E}{H\ R'}$$

in which R' is hydrogen or CH$_3$ and E represents an atom or group of atoms which constitute an electron sink, the terminal valences affixed to the final carbon atoms of said linear backbones being satisfied with substituents selected from the group X, OA and OR", wherein X is halogen, A is acyl or aroyl, including ester-acids derived from dibasic acids and anhydrides having less than 11 carbon atoms, and wherein R" is hydrogen and saturated or unsaturated hydrocarbon and having 1 to 10 carbons.

4. As a new composition of matter, a polymeric intermediate mixture comprising a first component consisting of linear polytetramethylene ether polymers containing a linear backbone of more than 300 and less than 3000 molecular weight units consisting entirely of the recurring units (O—CHR—CH$_2$CH$_2$CH$_2$)$_n$— in which R represents hydrogen or polymeric graft residues free of ethylenic unsaturation resulting from the polymerization of compounds of the formula $$\underset{HC=C-E}{H\ R'}$$

in which R' is hydrogen or methyl, in which E represents an atom or group of atoms which constitute an electron sink; and a second component consisting of cross-linked polymers in which linear backbones of polytetramethylene ether chains are linked together by at least one direct carbon-to-carbon bond having the formula $$-C_4H_7R-(O-C_4H_7R)_n-O-\underset{|}{C_4H_6R}-(O-C_4H_7R)_{n'}-$$
$$-C_4H_7R-(O-C_4H_7R)_m-O-\underset{|}{C_4H_6R}-(O-C_4H_7R)_{m'}-$$

in which $n$, $n'$, $m$ and $m'$ represent integers such that the molecular weight of the individual backbone chains is more than 300 and less than 3000, and in which R is as defined above, the terminal valences affixed to the final carbon atoms of said linear backbones being satisfied with substituents selected from the group X, OA and OR", wherein X is halogen, A is acyl or aroyl, including ester-acids derived from dibasic acids and anhydrides having less than 11 carbon atoms, and wherein R" is hydrogen and saturated or unsaturated hydrocarbon having 1 to 10 carbons.

5. As a new composition of matter, a cross-linked polymer in which linear backbones of polytetramethylene ether chains are linked together by at least one direct carbon-to-carbon bond having the formula $$-C_4H_7R-(O-C_4H_7R)_n-O-\underset{|}{C_4H_6R}-(O-C_4H_7R)_{n'}-$$
$$-C_4H_7R-(O-C_4H_7R)_m-O-\underset{|}{C_4H_6R}-(O-C_4H_7R)_{m'}-$$

in which $n$, $n'$, $m$ and $m'$ represent integers such that the molecular weight of the individual backbone chains is more than 300 and less than 3000, and in which R represents hydrogen, or substituent polymeric grafts free of aliphatic unsaturation resulting from the polymerization of compounds having the formula $$\underset{HC=C-E}{H\ R'}$$

in which R' is hydrogen or CH$_3$ and E represents an atom or group of atoms which constitute an electron sink, the terminal valences affixed to the final carbon atoms of said linear backbones being satisfied with substituents selected from the group X, OA and OR", wherein X is halogen, A is acyl or aroyl, including ester-acids containing ethylenic unsaturation derived from dibasic acids and anhydrides having less than 11 carbon atoms, and wherein R" is hydrogen and saturated or unsaturated hydrocarbon and having 1 to 10 carbons.

References Cited

UNITED STATES PATENTS 3,012,016  12/1961  Kirk et al. _____ 260—41
3,268,472  8/1966  Lal et al. _____ 260—2

OTHER REFERENCES

Courtlands Ltd., Chem. Abstracts, vol. 63, 5873a (1965).

SAMUEL H. BLECH, Primary Examiner

J. SEIBERT, Assistant Examiner

U.S. Cl. X.R.

260—610, 874, 898, 899, 901

PO-1050
(5/69)

UNITED STATES PATENT OFFICE
CERTIFICATE OF CORRECTION

Patent No. 3,544,487            Dated December 1, 1970

Inventor(s) Andrew P. Dunlop, Norman E. Rustad, Edward Shermar

It is certified that error appears in the above-identified patent and that said Letters Patent are hereby corrected as shown below:

Column 1, line 14 "ploymers" should read --polymers--. Column lines 16 through 18, that part of the formula reading $$)n-O-C_4H_6R-(O-C_4H_7R-)n'-$$
$$|$$
$$)m-O-C_4H_6R-(O-C_4H_7R-)m'-$$

should read $$)_n-O-C_4H_6R-(O-C_4H_7R-)_{n'}-$$
$$|$$
$$)_m-O-C_4H_6R-(O-C_4H_7R-)_{m'}-$$

Column 1, line 28 "ond" should read --and--. Column 2, lines 3 through 5, that part of the formula reading $$)n-O-C_4H_6R-(O-C_4H_7R-)n'-$$
$$|$$
$$)m-O-C_4H_6R-(O-C_4H_7R-)m'-$$

should read $$)_n-O-C_4H_6R-(O-C_4H_7R-)_{n'}-$$
$$|$$
$$)_m-O-C_4H_6R-(O-C_4H_7R-)_{m'}-$$

Column 2, line 20 "chloride" should read --chlorine--. Column 5, line 2, "quantity of intensity" should read --quantity or intensity--. Column 7, line 40, under MW (OSMO) "3,387" should read --1,387--. Column 9, line 18 "discussed" should read --degassed--. Column 12, line 41 "at mm." should read --at 2 mm.--. Column 12, line 48, Claim 1 "As a new composition of matter a" should read --A sulfur-free composition consisting of a carbon-to-carbon crosslinked--. Column 12, line 65, Claim 2, "A polymeric intermediate comprising a" should read --A sulfur-free polymeric intermediate consisting essentially of a--. Column 12, line 67, Claim 2 "ether crosslinked" should read --ether carbon-to-carbon crosslinked--. Column 13, line 7, Claim 3, "As a new composition of matter, a" should read --A sulfur-free composition consisting essentially of a carbon-to-carbon--. Column 13, line 31, Claim 4, "As a new composition of matter, a polymeric intermediate mixture comprising" should read --A sulfur-free polymeric intermediate mixture consisting essentially of--. Column 13, line 45, Claim 4 "of crosslinked" should read --of carbon-to-carbon crosslinked--. Column 14, line 12, Claim 5, "As a new composition of matter, a" should read --A sulfur-free composition consisting essentially of a carbon-to-carbon--.

Signed and sealed this 9th day of March 1971.

(SEAL)
Attest:

Edward M. Fletcher, Jr.
Attesting Officer

WILLIAM E. SCHUYLER,
Commissioner of Paten